March 11, 1941.  W. L. JEFFREY  2,234,433
TREE MOVER
Filed Aug. 22, 1939
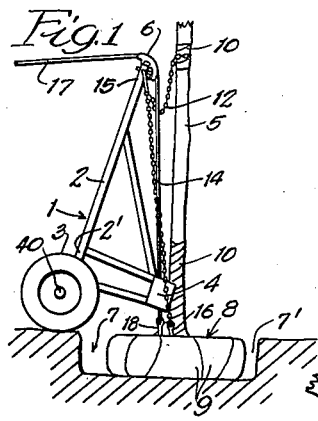
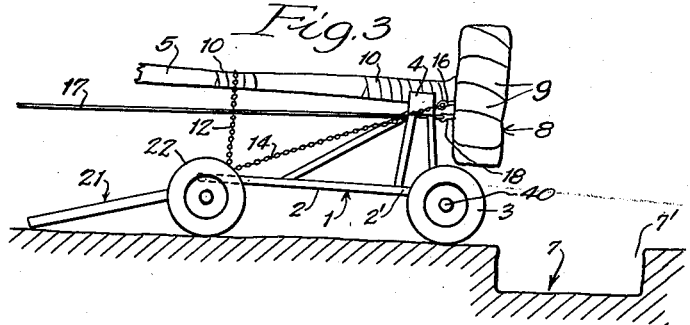
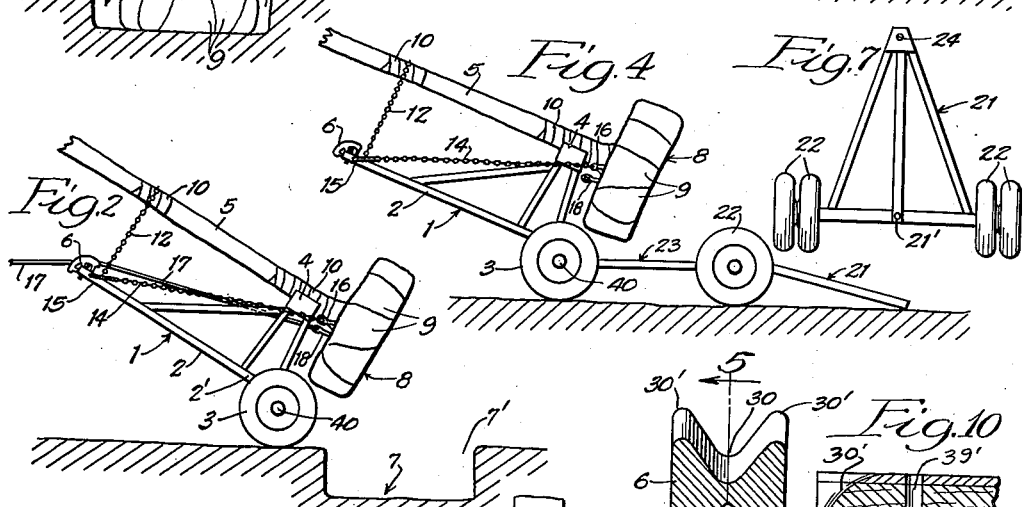
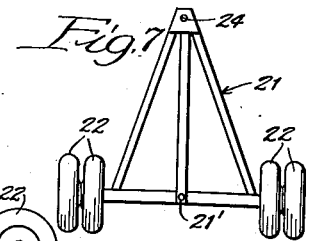
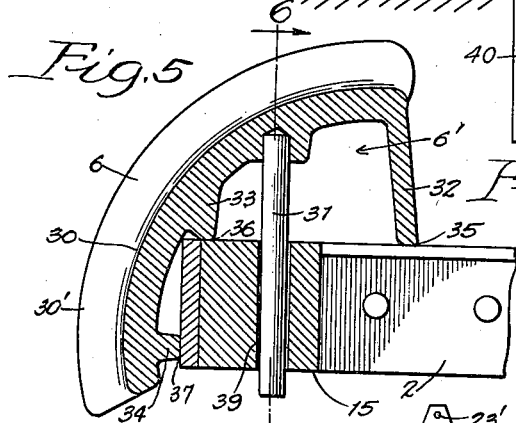
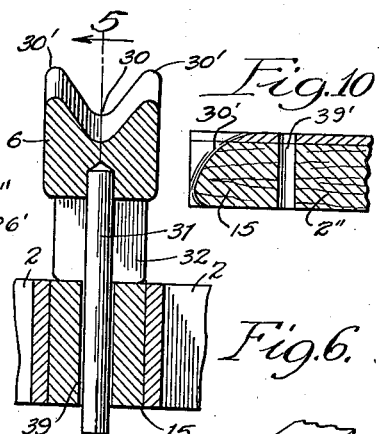
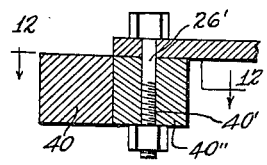
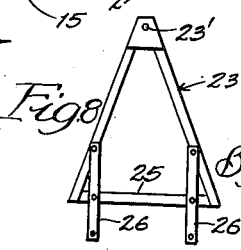
Inventor:
Wallace L. Jeffrey,
By Rummler, Rummler & Woodworth
Attorneys.

Patented Mar. 11, 1941

2,234,433

UNITED STATES PATENT OFFICE 2,234,433

TREE MOVER

Wallace L. Jeffrey, Fulton, Mo.

Application August 22, 1939, Serial No. 291,195

7 Claims. (Cl. 214—3)

This invention relates to the art of transplanting trees and more especially to improvements in apparatus for lifting, transporting, and setting trees of sizes such that they cannot be handled manually.

The main objects of my present invention are to improve upon and to provide new and better facilities for such devices and especially the transplanter of my copending application, Serial No. 263,815 filed March 23, 1939, now Patent No. 2,208,262; to provide in a tree mover, of the kind described, means for tilting downwardly the tower-chassis of the mover after it has been secured to an upright prepared tree so that ground engaging wheels or an auxiliary chassis having such wheels may be attached to the free end of the horizontally swung main chassis or tower member and hold it down while the chassis and supported tree as a whole is moved away from the hole left in the ground by the removal of the rootball; and to provide a cable on the swing end of such chassis.

The main object of the cable guide is to cause the frame work to be lowered during a tree moving operation to a substantially horizontal plane so as to install a set of wheels on what would normally be the rear end of the tree mover so as to withdraw the removed tree and tree mover away from the hole and thereby more readily and less dangerously attach the normal front wheels.

Another object of this invention is to equip the free end of the main chassis frame or tower with a removable upstanding or offset cable seat or guide where the frame attaches at times to the axis of the auxiliary chassis.

Further objects of this invention are to provide, a grooved cable guide attachment for tree mover towers adapted to enhance the leverage effect as the tree and tower approach a horizontal position; to provide for greater security and positiveness in operation of tree movers; to provide for greater safety of the workman and to provide a tree moving device of this kind which shall be simple in construction and inexpensive to manufacture and maintain.

Still further objects are to provide facilities appurtenant to such tree movers and their method of use, adapted to enable such immediate removal of the tree from its hole as to facilitate attachment of the auxiliary road chassis without danger either to the tree or to any of the workmen.

This invention is illustrated by the accompanying drawing in which:

Figure 1 is a side view of my improved tree mover set in place against a prepared tree ready for removal.

Fig. 2 is a sectional view showing the tree mover tilted to the left sufficiently to raise the tree and rootball clear of the ground.

Fig. 3 shows the tree mover and tree still further tilted to a substantially horizontal position with the tip of the tower attached to an auxiliary chassis ready for backing the remover away from the hole left by the root-ball.

Fig. 4 shows the auxiliary chassis secured to the root ball end of the main chassis, the latter being tilted upward somewhat at its free end, the equipment as a whole being ready for movement to the intended new tree-position.

Fig. 5 is an enlarged sectional view on the line 5—5 of Fig. 6 of an arcuate cable seat and guide on the free end of the chassis tower.

Fig. 6 is a cross section on the line 6—6 of Fig. 5.

Fig. 7 is a small-scale plan view of the auxiliary chassis.

Fig. 8 is a small-scale plan view of the two-chassis connector.

Fig. 9 is a perspective view of a modified form of cable guide or seat.

Fig. 10 is a sectional view taken on the line 10—10 of Fig. 9.

Fig. 11 shows a vertical sectional detail through the main chassis axial member of Fig. 4 illustrating the connection of the chassis represented in Fig. 8.

Fig. 12 is a view taken on line 12—12 of Fig. 11.

In the construction shown in the drawing, the main chassis 1 comprises an elongated triangular tower part 2 mounted on wheels 3 at its broad end or base 2', which is equipped with an upstanding bunk 4 adapted to receive the trunk of the tree 5 for transport.

The free peak end of said tower has an outstanding arcuate grooved guide bearing 6 mounted thereon, as shown in Figs. 5 and 6. Further details of construction will be explained in connection with the operation and use of the device.

The tree to be removed is first prepared by digging a trench 7' about the root-ball 8 after which suitable wrappings 9 and 10 are applied both to the root-ball and to those parts of the trunk which might be bruised by contact with the bunk 4 and the pull-chain or cable 12.

Fig. 1 shows the main chassis 1 in place uprightly against the prepared tree 5 with the bunk 4 resting directly against the trunk close to the root-ball 8, the wheels 3 being locked. A chain 14 extends from the free peak end 15 of the chassis 1 to a screw-hook 16 set firmly in the root-ball. The other chain 12 extends from the said free end 15 to that part of the trunk which is directly opposite, with sufficient slack to accommodate a parallel position of the trunk relative to the chassis during transport. A power cable 17 extends from another screw-hook 18 set in the root-ball, up over the guide 6 and off for a considerable distance to a winch or tractor, not shown, as will be understood. This cable 17 may be attached to the bunk 4 instead of to the root-ball.

The next step is illustrated by Fig. 2, wherein the inclined tree 5 is shown resting on the bunk 4 and with both of the chains 12—14 and power cable 17 in tension as the tree swings toward its horizontal load position, with the root-ball raised clear of its hole 7. This position was effected by exerting a pulling action on the cable 17 through action of the winch or tractor, not shown. Fig. 3 shows the tree in its same position relative to the chassis 1, but here both are horizontal. Fig. 3 shows also the free end 15 of chassis tower resting upon and attached to the base of an auxiliary wheeled chassis 21 and with the power cable 17 still in tension but in a horizontal position spaced above its guide 6. The main chassis wheels 3 are next unlocked whereupon continued pull on the power cable 17 draws the main chassis away from the hole 7 sufficiently to avoid danger from proximity to the hole; cave-in of the sides of the trench 7'; and so also as to facilitate transfer of the auxiliary chassis on its wheels 22 from the tower tip 15 to the front end of the main chassis as shown in Fig. 4, where chassis 1 and 21 are connected by a link member or reach 23 adapted to be set rigidly in the base part of chassis 1.

Here the main chassis 1 and tree are tilted upwardly somewhat and the weight of the root-ball overhanging between the wheels 3 of the main chassis and the auxiliary chassis 21 assure stable position and balance of the tree in transport when the tractor, not shown, is attached at 24 to the front end of the auxiliary chassis 21 shown at the right of Fig. 4. The link 23 is a substantially triangular frame with its base 25 rigidly connected to chassis 1 under the root-ball. Its forward tip is pivoted to chassis 21.

Referring now to structural features of the cable seat or guide 6, it is to be noted that the bearing face groove 30 extends convexly through about 90° on a specially formed block which may well be made of cast metal, with a vertical mounting pin 31, the top of which may be set permanently therein. This block is hollowed out somewhat on its concave side as at 6' where three bearings 32—33—34 are provided as shown, two resting on the top of the chassis as at 35 and 36 and one against its end as at 37. The said pin is received in a vertical hole 39 extending through the tip 15 of the chassis tower, as viewed in Fig. 5. This construction facilitates ready application and removal of the guide 6 according to needs in various stages of use, just by setting it down and lifting it off respectively. The deep groove 30 having side walls 30' keeps the cable 17 in place and prevents side swing of the chassis during the lifting operation.

A further explanation of the use and value of the cable attachment feature may be helpful to a full appreciation of my invention. Very frequently the tree to be moved is located in a somewhat muddy bottom. The truck and its winch must be stationed on higher land near by for good footing. The power truck may be setting as much as twenty-five feet higher than the tree mover. Without my special cable attachment in that position of the mover it is absolutely impossible to lower the frame or chassis enough to load the tree.

*Operation*

Whenever a tree 5 of appropriate size for the use of my invention is to be transplanted, a trench 7' is dug about the root part 8 as shown in Fig. 1 and appropriate wrappings are applied as at 9 and 10.

The main vehicle member comprising chassis 1 and wheels 3 is then set in place uprightly against the tree as shown in Fig. 1. The chain 14 and cable 11 are secured to the screws 16 and 18 respectively in the tree-ball and chain 12 is secured to the trunk opposite the guide 6 whereon cable 17 rests. The bunk 4 is fitted snugly against the tree close to the root-ball 8 and the wheels 3 are locked.

In the modified form of construction shown in Figs. 9 and 10, the medial link or reach 2" is provided with a bearing face groove 30" formed and arranged in the forward end 15 of the chassis 1 and extends convexly therethrough about 90°. The vertical hole 39' in this instance is set back further from the end 15 than in the preferred embodiment. It can readily be seen that the action accomplished by chassis 1 by the use of the removable guide 6 can forthwith be accomplished by employing this modified form as will be readily understood.

Tension is then applied to cable 17 as by means of a tractor or equivalent means, not shown, whereupon with the wheels 3 and axle 40 serving as a fulcrum, the chassis 1 is swung downward toward the left, as viewed in Fig. 1. This results in powerful lifting tension on the chain 14 and the downwardly extending part of cable 17. Then, as the pull continues the tree as a whole is lifted somewhat and chain 12 is thrown in tension by reason of the overbalancing weight of the root-ball tending to throw the trunk away from said chassis.

Further pull on cable 17 brings the chassis 1 and tree into the position shown in Fig. 2 where, as will be seen, the cable 17 rides on the upstanding guide 6 which is formed and adapted to prevent lateral swing of the chassis end 15 and also permits downward swing of said end 15 away from the cable as soon as cable 17 comes to a horizontal position as shown in Fig. 3. At this stage the chassis 1 swings down to a horizontal position below cable 17 whereupon the auxiliary chassis 21 is set in place, the guide 6 now being lifted off and chassis tip 15 pivotally secured to the base of chassis 21 at 21' midway between its wheels 22, as in Fig. 3. This auxiliary chassis 21 serves as a counter balance in place of cable 17 to hold the main chassis 1 horizontal.

Further pull on the cable 17 or a simultaneous pull exerted through the chassis 21, by any suitable means, now draws the tree and apparatus as a whole rearwardly away from the root hole 7 far enough to give ample clearance and avoid accidents that might occur from too close proximity during further steps in the process.

The next operation, with cable 17 still in tension and wheels 3 locked, is to disconnect the auxiliary chassis 21 from tip 15 and bring it around opposite the root-ball as shown in Fig. 4 where it is pivotally connected at 21' to the forward end 23' of the connector or reach 23, the broad base 25 of which, by means of its lugs 26 is set rigidly on chassis 1 between its wheels 3. The connecting parts of chassis 1 and link member 23 are so formed that when the tension on cable 17 is relaxed appropriately and the chassis 1 is thus permitted to swing upward somewhat to the position of Fig. 4, due to the weight of the ball, said connecting parts may be placed in mutual engagement and there fastened, so as to keep the tree branches well off the ground. In so doing the free ends of lugs 26 on connector link 23 are placed over the slots 40' in the bearing 40'' formed integral on axle 40, as shown in Figs. 11 and 12, and are there held by bolts 26'.

The mover as a whole is now ready for transport and any suitable motor car, van or tractor is attached to the forward end 24 of the auxiliary chassis 21.

Upon arrival at the new tree site, a hole already having been prepared, the reverse operation substantially is followed, as will be apparent, whereby the tree is gently lowered into place. The wrappings are then removed and earth tamped around the roots, whereupon the operation is complete.

It is to be understood that some of the details set forth may be altered or omitted without departing from the spirit of this invention as defined by the following claims.

I claim:

1. A tree transplanter comprising a V-shaped bunk-chassis having a pair of road wheels at its broad end, one on each side, whereon the chassis is tiltable, as when it is applied to the tree, a bunk on said chassis, a cable having means at one end to engage the tree-ball, a guide removably mounted on the narrow end of said chassis to releasably receive and guide said cable as the tree is being lifted and swung over onto the chassis, and means to secure the tree to said chassis.

2. A tree transplanter comprising an oblong bunk-chassis having a pair of road wheels at one end, one on each side, whereon the chassis is tiltable when applied to the tree, a power cable having means at one end to engage the tree-ball, a pair of chains attached to the opposite end of said chassis with their opposite ends attached to the root-ball and tree trunk respectively, and a grooved guide removably mounted on the narrow end of said chains to releasably receive and guide said cable as the tree is lifted and pulled over onto the chassis by means of said cable.

3. A tree transplanter comprising a V-shaped elongated chassis having a pair of road wheels at its broad end, one on each side, whereon the chassis is tiltable upward to nearly a vertical position to receive the standing tree, a cable-guide at the chassis apex, an upstanding bunk fixed on the broad end of said chassis to bear against and receive the base part of the tree trunk, a chain having one end adapted to be secured to the root-ball, with a medial part attached to the narrow end of the chassis and another part adapted to extend thence to the tree trunk for securing thereto, and a power cable adapted to be secured at one end to the tree-ball and to extend thence tangentially to and through said guide and onto a source of tractive power.

4. A tree transplanter comprising an elongated chassis having a bunk and a pair of road wheels at one end, one on each side, whereon the chassis is tiltable upward to nearly a vertical position to receive the tree, the other end of the chassis being formed with an apex, a removably attached guide at the chassis apex, said bunk being adapted to bear against and receive the base part of the tree trunk, a chain having one end adapted to be secured to the root-ball, with a medial part attached to the swing end of the chassis and another part adapted to extend thence to the tree trunk for securing thereto, and a power cable adapted to be secured at one end to the tree-ball and to extend thence to and through said guide and on to a somewhat remote source of tractive power.

5. The method of moving a tree which consists in securely applying thereto a tiltable wheeled chassis in its standing position, loading the tree on said chassis by pulling over and downward arcuately the upper end of the chassis by means of a power cable secured to the tree ball and passing over a guide on the swing end of the chassis, then with the power cable raised and in tension, removing the cable-guide from said chassis and attaching an auxiliary wheeled chassis in its place, then pulling the loaded chassis away from the root-ball pit, then securing a reach on the root-ball end of said chassis, then transferring the auxiliary chassis from the swing end of the first chassis to its opposite end when secured to the free end of said reach and thus making substantially a four-wheeled vehicle ready for transport wherever desired.

6. The method of moving a tree which consists in applying thereto a tiltable wheeled bunk-chassis in its up-ended standing position, loading the tree on said chassis by pulling over and downward arcuately the upper end of the chassis by means of a power cable secured to the tree ball and passing over the swinging end of the chassis, then with said cable still holding the chassis and tree in place horizontally, attaching an auxiliary wheeled chassis to the swing end of the bunk-chassis, then pulling the loaded bunk-chassis away from the root-ball pit, then securing a reach on the root-ball end of said chassis, then transferring the auxiliary chassis from the swing end of the first said chassis to its opposite end where it is attached to the free end of the reach, thus making substantially a four-wheeled vehicle ready for transport wherever desired.

7. A tree transplanter comprising a V-shaped bunk-chassis having a pair of road wheels at its broad end, one on each side, whereon the chassis is tiltable, as when it is applied to the tree, a cable having means at one end to engage the tree-ball and a guide on the narrow end of said chassis to releasably receive and guide said cable as the tree is being lifted and swung over onto the chassis and to lower the narrow end of said chassis into close proximity to the ground.

WALLACE L. JEFFREY.